United States Patent
Jurcak et al.

(10) Patent No.: US 7,074,058 B2
(45) Date of Patent: *Jul. 11, 2006

(54) STEEL FUEL FLANGE WITH PLASTIC STRUT MOUNTS

(75) Inventors: Michael J. Jurcak, Columbus, MI (US); Paul F. Briggs, Grand Blanc, MI (US)

(73) Assignee: Siemens VDO Automotive Corporation, Auburn Hills, MI (US)

( * ) Notice: Subject to any disclaimer, the term of this patent is extended or adjusted under 35 U.S.C. 154(b) by 152 days.

This patent is subject to a terminal disclaimer.

(21) Appl. No.: 10/783,134

(22) Filed: Feb. 20, 2004

(65) Prior Publication Data

US 2004/0168295 A1    Sep. 2, 2004

Related U.S. Application Data

(60) Provisional application No. 60/451,029, filed on Feb. 27, 2003.

(51) Int. Cl.
*H01R 13/648* (2006.01)

(52) U.S. Cl. .......................... 439/92; 439/939

(58) Field of Classification Search ............... 29/513, 29/505, 506, 509, 428; 439/92, 939, 95; 403/274
See application file for complete search history.

(56) References Cited

U.S. PATENT DOCUMENTS

| | | | |
|---|---|---|---|
| 2,273,214 A | 2/1942 | McConaghy | 103/218 |
| 4,569,637 A | 2/1986 | Tuckey | 417/360 |
| 5,056,492 A | 10/1991 | Banse | 123/509 |
| 5,080,077 A | 1/1992 | Sawert et al. | 123/514 |
| 5,482,444 A | 1/1996 | Coha et al. | 417/363 |
| 5,540,192 A | 7/1996 | Xanders | 123/41.44 |
| 5,762,049 A | 6/1998 | Jones et al. | 123/514 |
| 6,036,453 A | 3/2000 | Zepp et al. | 417/410.4 |
| 6,062,203 A | 5/2000 | Takahashi et al. | 123/509 |
| 6,302,747 B1 | 10/2001 | Bui et al. | 439/736 |
| 6,336,794 B1 | 1/2002 | Kim | 417/363 |
| 6,488,877 B1 | 12/2002 | Amburgey et al. | |
| 6,499,453 B1 | 12/2002 | Immel et al. | 123/90.31 |
| 6,890,190 B1 * | 5/2005 | Jurcak et al. | 439/92 |
| 2002/0061253 A1 | 5/2002 | Poissant | |
| 2002/0163263 A1 | 11/2002 | Uffelman | |
| 2003/0000502 A1 | 1/2003 | Jones et al. | |
| 2003/0002997 A1 | 1/2003 | Hazama | |

\* cited by examiner

Primary Examiner—John C. Hong

(57) ABSTRACT

A method of coupling a metal strut 14 to a metal flange 10 of a fuel supply unit is provided. The method provides a metal flange 10 having a plurality of tabs 46 coupled to and extending from a bottom surface of the flange 10. A plastic strut holder structure 36 holds at least one metal strut 14. The plastic strut structure is engaged with the tabs 46 thereby securing the strut with respect to the flange.

13 Claims, 9 Drawing Sheets

STEEL FUEL FLANGE WITH PLASTIC STRUT MOUNTS

This application is based on U.S. Provisional Application No. 60/451,029, filed on Feb. 27, 2003, and claims the benefit thereof for priority purposes.

FIELD OF THE INVENTION

The invention relates to fuel supply units for automobile vehicles and more particularly, to a plastic strut mount for connecting metal struts to a flange of the fuel supply unit.

BACKGROUND OF THE INVENTION

A typical fuel supply unit for a vehicle includes a steel fuel flange configured to be sealed to a wall of a fuel tank. The flange is interconnected with a fuel pump assembly by a pair of metal struts. Typically, metal mounts, cups or brackets are used to secure the struts in place with respect to the flange. The struts are typically secured to the brackets or mounts using a welding process that increases costs of assembly. In addition, the flange supplier must deal with the struts extending from the flange, which increases the complexity of shipping the flange, and increases the number of parts required at the flange supplier. Furthermore, the reliability of the strut-flange connections needs to be improved.

Accordingly, there is a need provide a plastic strut mount structure for a fuel supply unit so that assembly of the unit can be made more easily.

SUMMARY OF THE INVENTION

An object of the invention is to fulfill the need referred to above. In accordance with the principles of the present invention, this objective is obtained by providing a method of coupling a metal strut to a metal flange of a fuel supply unit. The method provides a metal flange having a plurality of tabs coupled to and extending from a bottom surface of the flange. A plastic strut holder structure holds at least one metal strut. The tabs are engaged with the plastic strut holder structure thereby securing the strut with respect to the flange.

In accordance with another aspect of the invention, a flange assembly of a fuel supply unit includes a metal flange having a bottom surface; a plurality of tabs coupled to the bottom surface; at least one metal strut; and a plastic strut holder structure holding an end of the at least one metal strut. The plastic strut holder structure is secured to the flange by engagement with the tabs thereby securing the plastic strut holder structure and the at least one metal strut with respect to the flange.

In accordance with yet another aspect of the invention, a connection between a metal flange of a fuel supply unit and at least one metal strut is provided. The flange includes a plurality of tabs coupled to an underside thereof. The connection includes a plastic strut holder structure constructed and arranged to hold an end of the at least one metal strut. The plastic strut holder structure is constructed and arranged to be engaged with the tabs, thereby securing the plastic strut holder structure and the at least one metal strut with respect to the flange.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF THE EXEMPLARY EMBODIMENT

Figure 1:
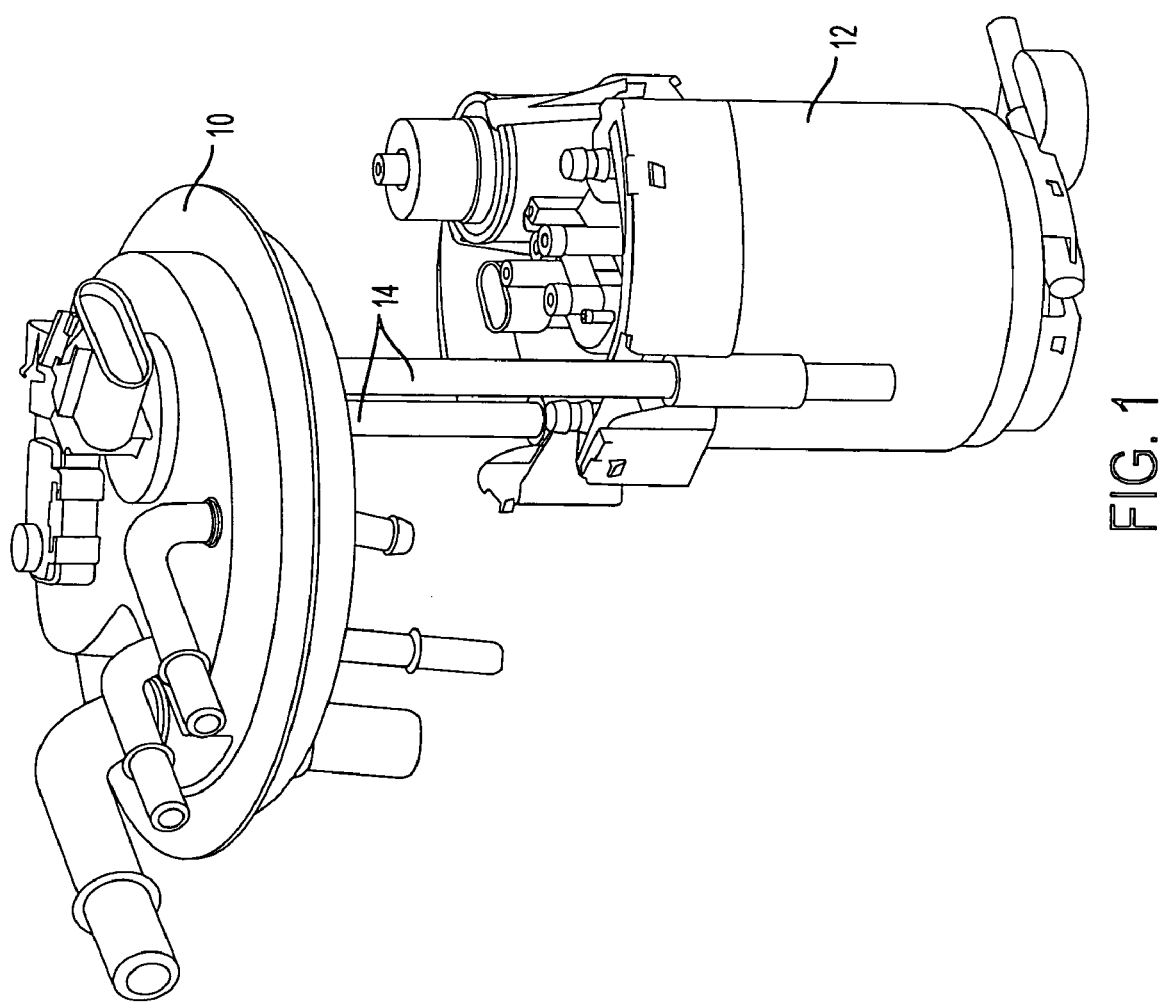
FIG. 1 is a perspective view of a fuel supply unit showing a flange connected with a fuel pump via struts in accordance with the principles of the present invention.
Figure 2:
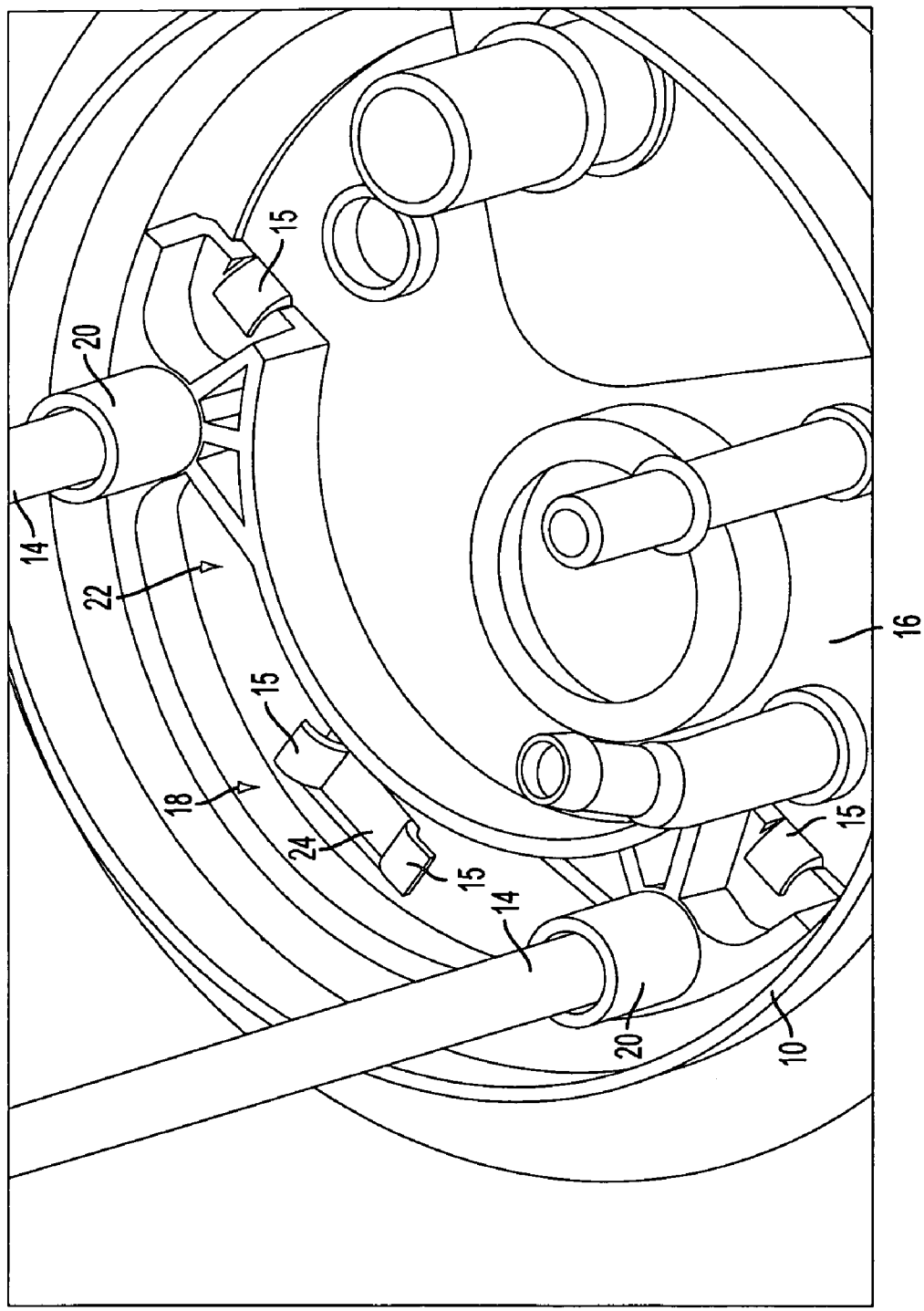
FIG. 2 is an enlarged perspective view of a bottom of the flange of FIG. 1, showing a first embodiment of a plastic strut holder of the invention.

With reference to FIG. 1, a flange 10 is interconnected with a fuel pump assembly 12 by a pair of metal struts 14, in accordance with the principles of the present invention. A first embodiment of a connection of the struts 14 with the bottom of the flange 10 is shown in FIG. 2. A plurality of metal tabs 15 is joined to or integral with a metal or steel insert 16. The insert 16 is welded or otherwise connected to the flange and can be considered to be part of the bottom or underside of the flange 10. In accordance with the embodiment of FIG. 2, a one-piece plastic strut holder, generally indicated at 18, includes a pair of strut-receiving bosses 20, each having an opening for receiving and holding and end of a metal strut 14 in preferably a press-fit arrangement. The end of the strut 14 can include a barb that bites into the plastic for secure coupling with the strut holder 18. The bosses 20 are molded integrally with a body 22 of the strut holder 18. The body 22 is of generally semi-circular configuration and has a central portion including an opening 24 there through. Tabs 15 extend through the opening 24 and are bent to secure the central portion of the strut holder 18 to the flange 10. Tabs 15 are also at ends of the body 22 to secure the ends of the body to the flange 10.

Figure 3:
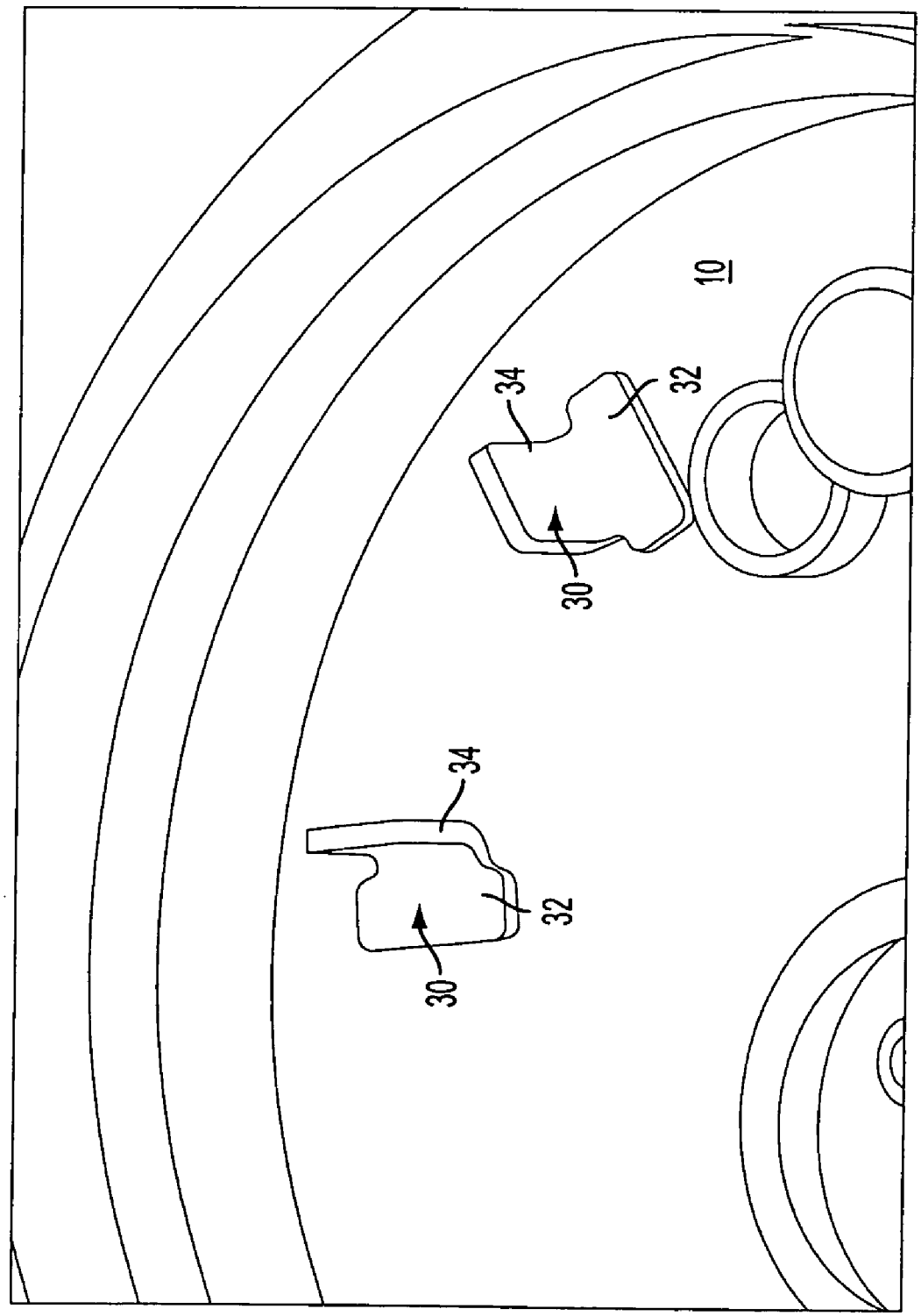
FIG. 3 is an enlarged perspective view of a bottom of the flange of FIG. 1, showing tabs welded thereto for holding a plastic strut holder of a second embodiment of the invention.
Figure 4:
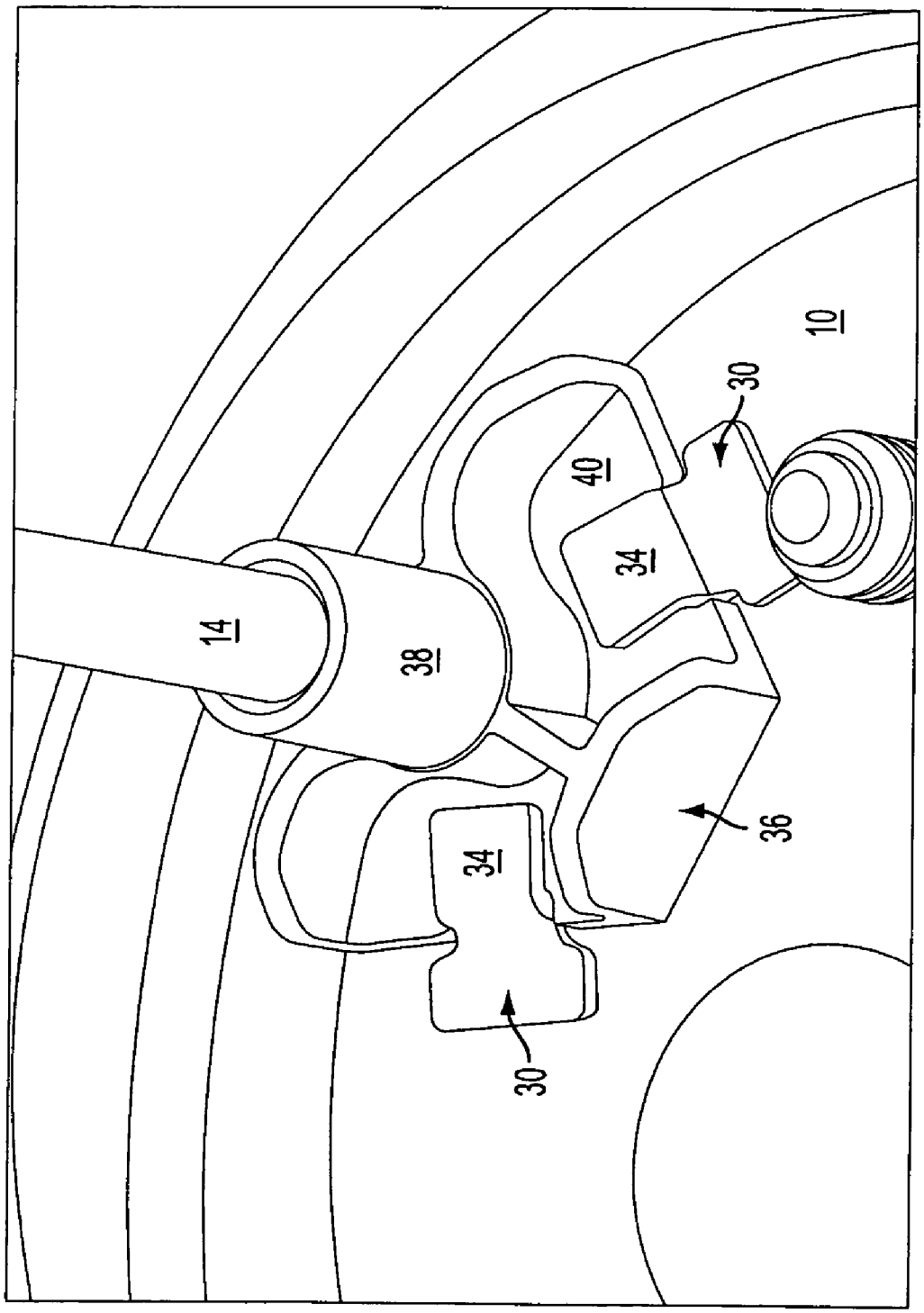
FIG. 4 is an enlarged perspective view of a bottom of the flange of FIG. 1, showing a plastic strut holder of the second embodiment of the invention held by the tabs of FIG. 3.

In accordance with a second embodiment of the invention, FIG. 3 shows a pair of metal tabs, generally indicated at 30, secured, by welding or the like, to the bottom of the flange 10, which are associated with securing a strut 14 with respect to the flange 10. Thus, two pairs of metals tabs 30 are provided on the bottom of the flange 10. The metal tabs 30 are generally L-shaped having a first portion 32 secured to the flange 10 and a second portion 34 extending generally upwardly from the first portion 32. A plastic strut holder, in accordance with the second embodiment of the invention is shown generally indicated at 36 in FIG. 4. One strut holder 36 is provided for each strut 14. The strut holder 36 has a boss 38 having an opening for receiving and holding an end of the metal strut 14 in preferably a press-fit arrangement. The boss 38 extends from a body 40. The portions 34 of the tabs 30 are bent to secure the strut holder 36 to the flange 10.

Figure 5:
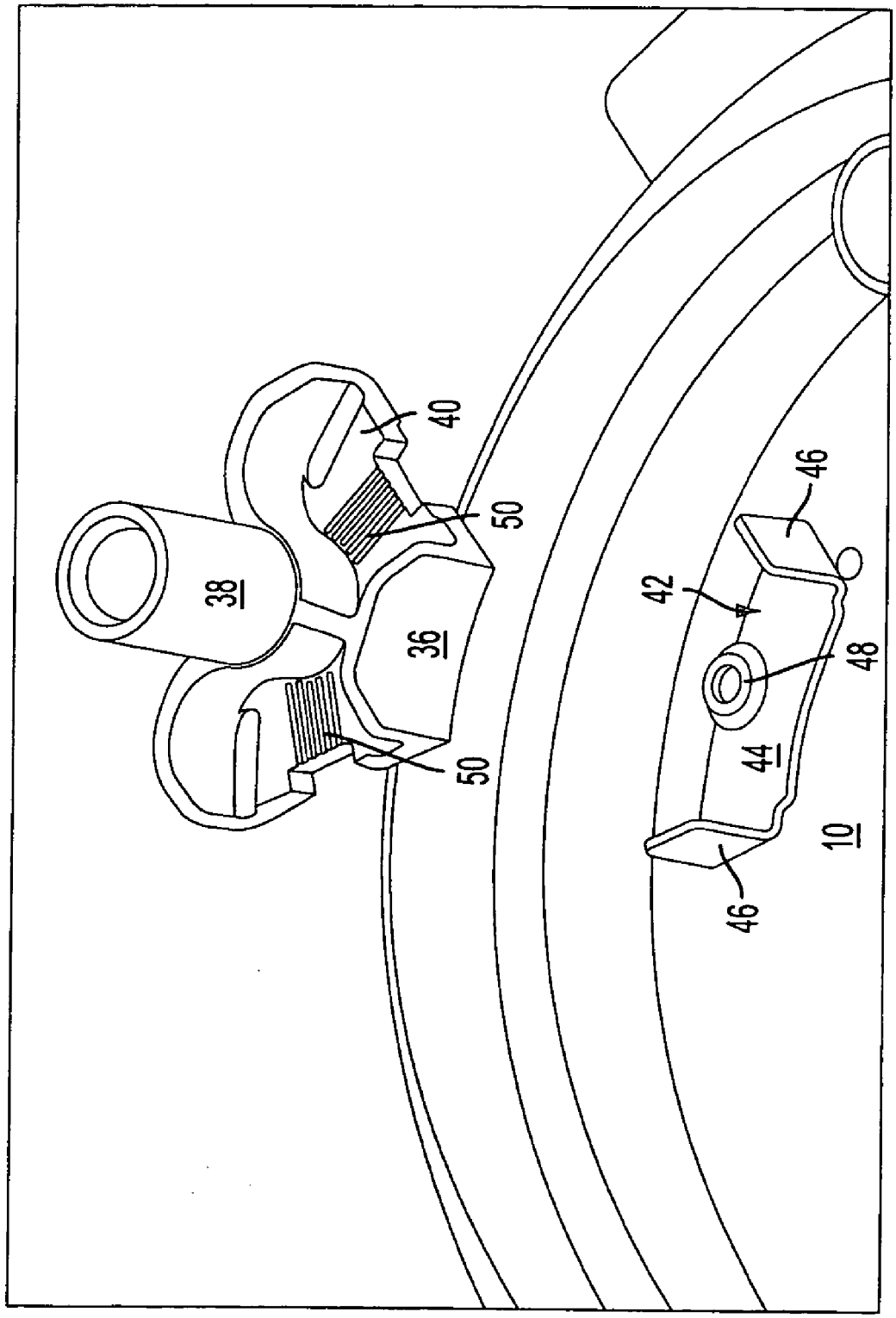
FIG. 5 is an enlarged perspective view of a bottom of the flange of FIG. 1, showing a single tab bracket welded thereto for holding to plastic strut holder of a third embodiment of the invention.
Figure 6:
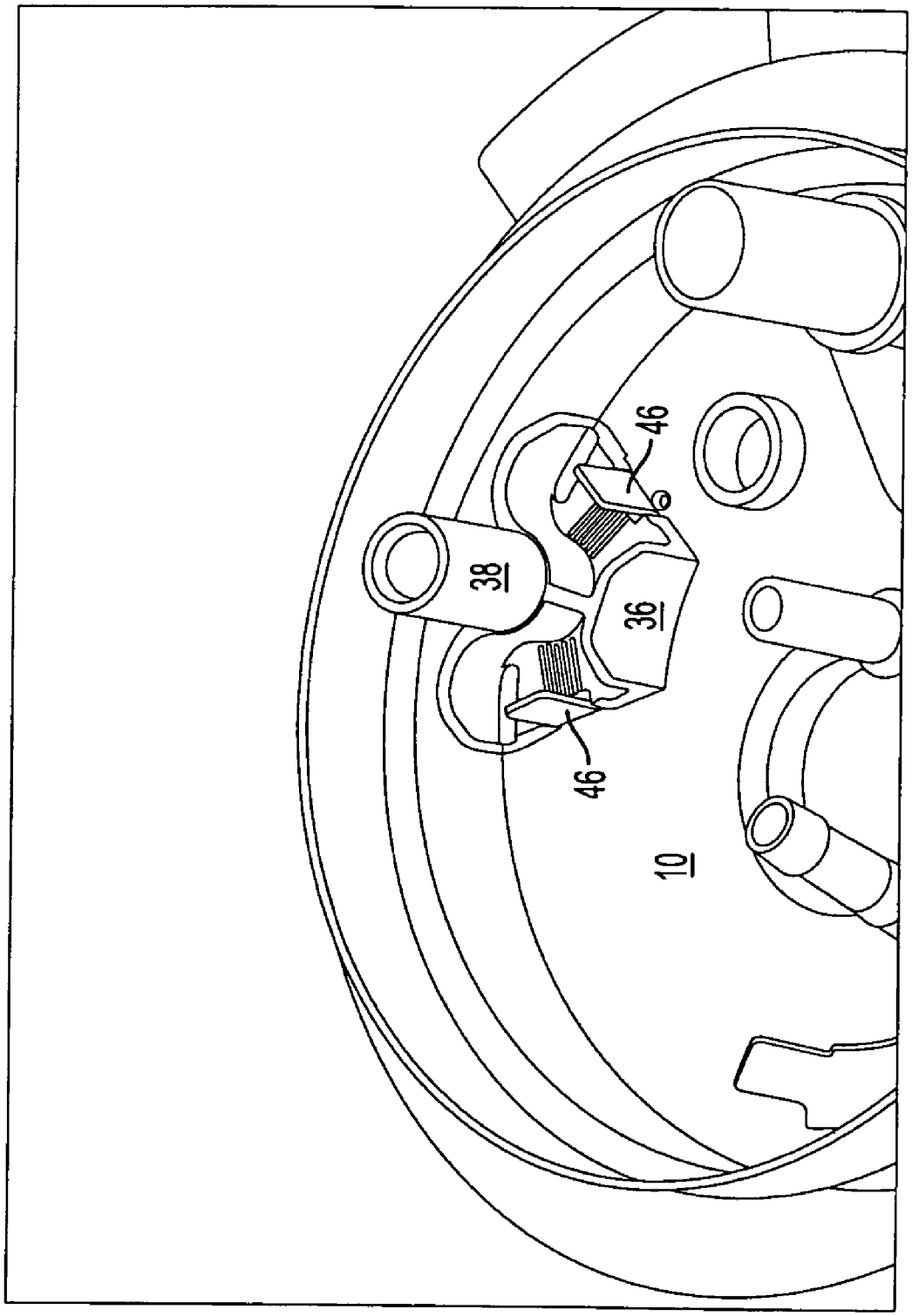
FIG. 6 is an enlarged perspective view of a bottom of the flange of FIG. 1, showing a plastic strut holder of the third embodiment of the invention being located with respect to the tab bracket of FIG. 5.
Figure 7:
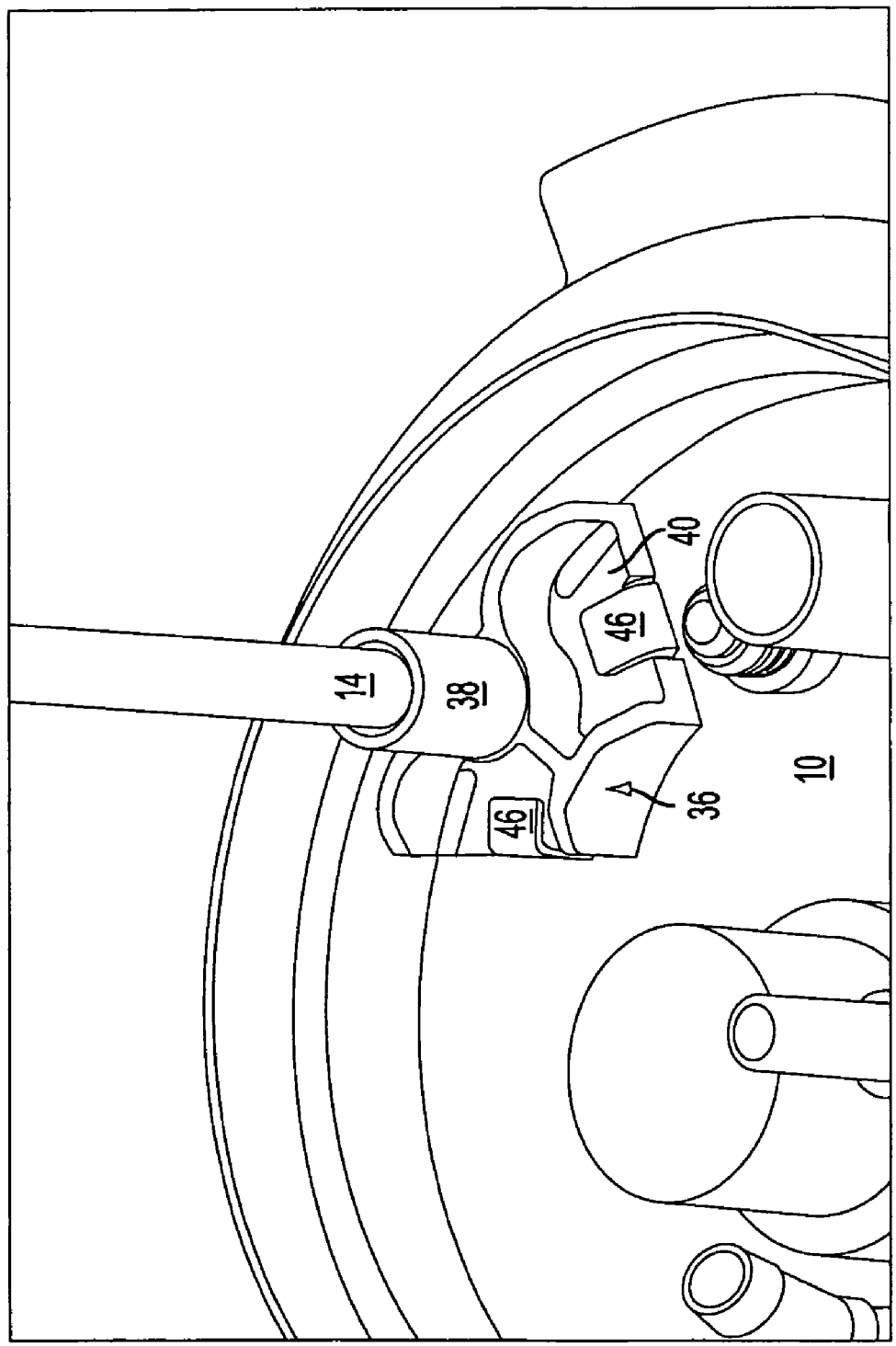
FIG. 7 is an enlarged perspective view of a bottom of the flange of FIG. 1, showing the plastic strut holder of the third embodiment of the invention secured by the tabs of the tab bracket of FIG. 5.

In accordance with a third embodiment of the invention, FIG. 5 shows a single metal tab bracket, generally indicated at 42, secured, by welding or the like, to the bottom of the flange 10 which is associated with securing a strut 14 with respect to the flange 10. Thus, two tab brackets 42 are provided on the bottom of the flange 10. Each tab bracket 42 has a base 44 secured to the flange 10 and tabs 46 extending generally upwardly from ends of the base 44. The base 44 also includes a mounting boss 48 that can receive an end of the metal strut so as to ground the strut. A plastic strut holder 36, of the same configuration as the second embodiment, is shown ready to be coupled to the tab bracket 42 in FIG. 6. One strut holder 36 is provided for each strut 14. The strut holder 36 has a boss 38 having an opening for receiving and holding an end of the metal strut 14. The end of the strut 14 can be received in the opening of boss 48 if grounding is desired. The strut holder 36 includes crush ribs 50 on body 40 to prevent the plastic from breaking during bending of the tabs 46 (or tabs 30 of FIG. 4). As shown in FIGS. 5–7, the strut holder 36 is located over the tab bracket 42 and the tabs 46 are bent to secure the strut holder 36 to the flange 10.

Figure 8:
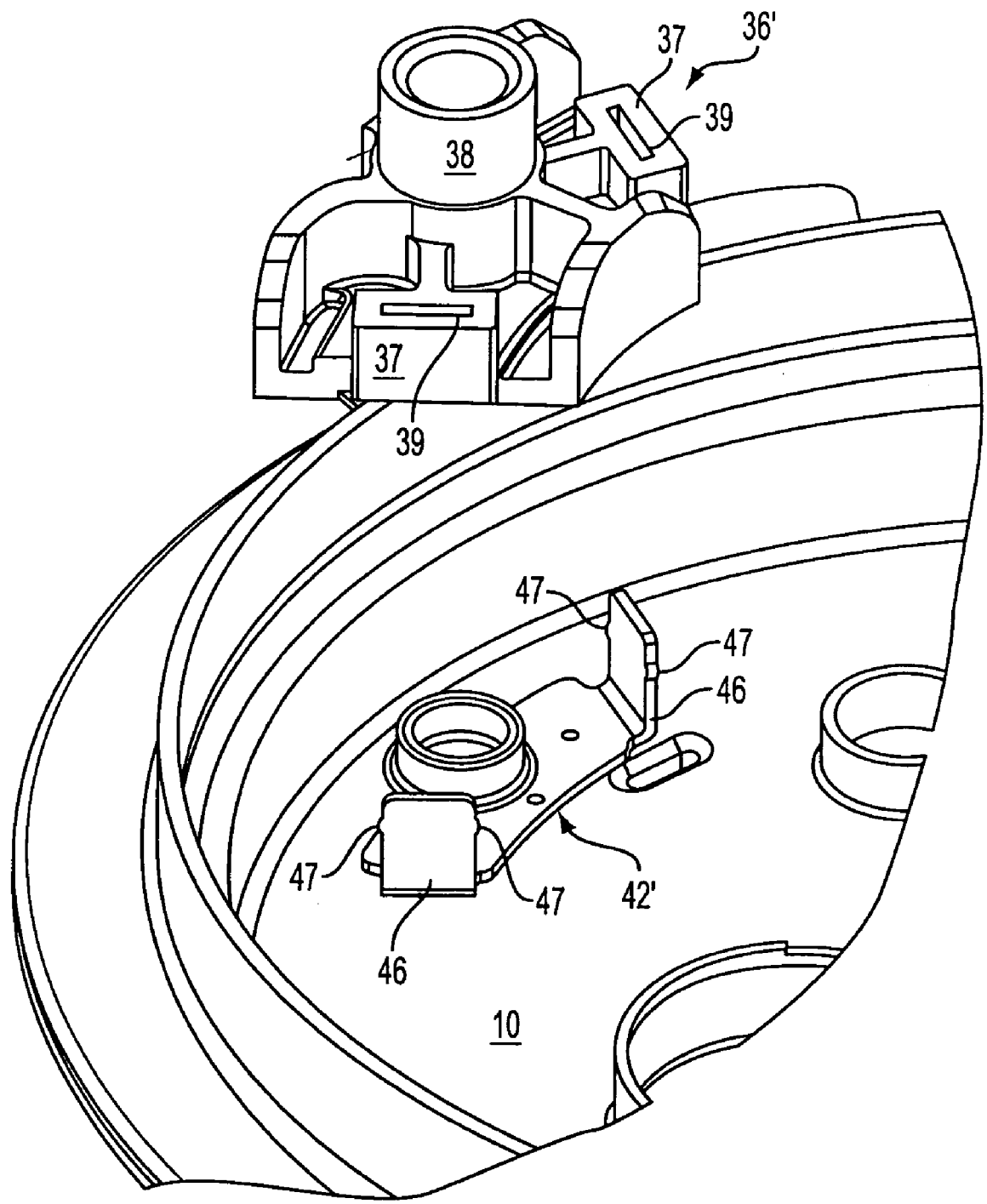
FIG. 8 is an enlarged perspective view of a bottom of the flange of FIG. 1, showing a plastic strut holder of the fourth embodiment of the invention being located with respect to a tab bracket.
Figure 9:
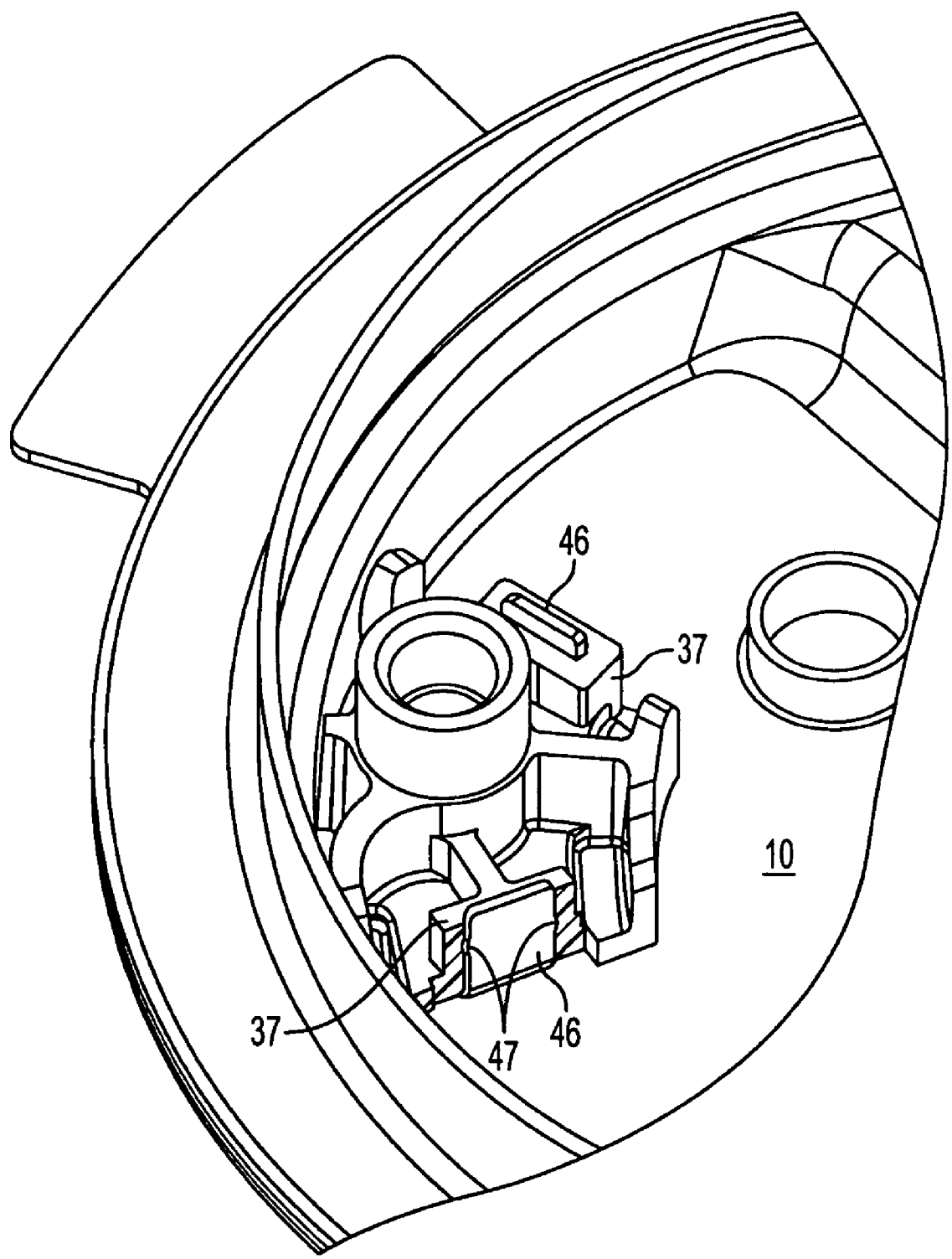
FIG. 9 is an enlarged perspective view of a bottom of the flange of FIG. 1, showing the plastic strut holder of the fourth embodiment of the invention secured by the tabs of the tab bracket of FIG. 8.

In accordance with a fourth embodiment of the invention as shown in FIGS. 8 and 9, the metal tab bracket 42' fixed to the bottom of the flange 10 is similar to that shown in FIG. 5, but each tab 46 includes at least one barb 47 extending from an edge thereof. A pair of barbs extends from each tab 46 in the illustrated embodiment. The plastic strut holder 36' includes tab receiving members 37 each having a channel 39 therethrough. A tab 46 is received in an associated channel 39 of a tab-receiving member 37 with the barbs 47 engaging the surfaces defining the channels 37 (FIG. 9) to secure the tabs 46 with respect to the tab-receiving member 37. Part of a tab-receiving member 37 is shown in section to clearly show the engagement with the tab 46.

A method of coupling a metal strut to a metal flange of a fuel supply unit in accordance with the invention provides a metal flange 10 having a plurality of tabs 30 coupled to and extending from a bottom surface of the flange. A plastic strut holder structure 36 holding at least one metal strut 14. The plastic strut holder structure is engaged with the tabs thereby securing the plastic strut holder structure and strut with respect to the flange.

Advantages of using the plastic strut holders of the invention are:

Reliability: The steel struts 14 hold better in plastic than in steel.

Cost: At the flange manufacturer, there is less welding and manufacturing time due to the use of the plastic strut holder. The flange supplier does not have to deal with the long struts attached to the flange, since the struts can be attached later. This will improve quality from the flange supplier: ease of shipment, lower part numbers if only difference in application is strut length, more accurate location of the struts for further assembly in-house.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A connection between a metal flange of a fuel supply unit and at least one metal strut, the flange including a plurality of tabs coupled to an underside thereof, the connection including:

a plastic strut holder structure constructed and arranged to hold an end of the at least one metal strut, the plastic strut holder structure being constructed and arranged to engage the tabs, thereby securing the plastic strut holder structure and the at least one metal strut with respect to the flange.

2. The connection of claim 1, wherein the plastic strut holder structure includes a boss having an opening, the opening being sized to receive an end of the at least one metal strut in a press-fit arrangement.

3. The connection of claim 1, wherein the tabs are constructed and arranged to be bent to engage a surface of the plastic strut holder, and the plastic strut holder structure includes crush ribs constructed and arranged to deform upon engagement with a tab.

4. The connection of claim 1, wherein the plastic strut holder structure is a single member having a pair of bosses, each boss having an opening for receiving an associated metal strut, each opening being sized to receive an end of an associated metal strut in a press-fit arrangement.

5. The connection of claim 1, wherein the tabs are constructed and arranged to be bent so as to engage a surface of the plastic strut holder structure.

6. The connection of claim 1, wherein each tab includes at least one barb and the plastic strut holder structure includes a tab-receiving member, the tab being received in the tab-receiving member with the barb engaging the tab-receiving member to secure the tab with respect to the tab-receiving member.

7. A flange assembly of a fuel supply unit comprising:

a metal flange having a bottom surface, a plurality of tabs coupled to the bottom surface, at least one metal strut, and a plastic strut holder structure holding an end of the at least one metal strut, the plastic strut holder structure being secured to the flange by engagement with the tabs thereby securing the plastic strut holder structure and the at least one metal strut with respect to the flange.

8. The flange assembly of claim 7, wherein the plastic strut holder structure includes a boss having an opening, the opening receiving an end of the at least one metal strut in a press-fit arrangement.

9. The flange assembly of claim 7, wherein the tabs are constructed and arranged to be bent to engage a surface of the plastic strut holder structure, and the plastic strut holder structure includes crush ribs constructed and arranged to deform upon engagement with a tab.

10. The flange assembly of claim 7, wherein the plastic strut holder structure is a single member having a pair of bosses, each boss having an opening receiving an associated metal strut in a press-fit arrangement.

11. The flange assembly of claim 10, wherein the single member includes a body having first and second ends and a tab opening therethrough located between the ends, a tab contacting each end and at least an edge that defines a portion of the tab opening.

12. The flange assembly of claim 7, wherein the tabs are constructed and arranged to be bent so as to engage a surface of the plastic strut holder structure.

13. The flange assembly of claim 7, wherein each tab includes at least one barb and the plastic strut holder includes a tab-receiving member, the tab being received in the tab-receiving member with the barb engaging the tab-receiving member to secure the tab with respect to the tab-receiving member.

* * * * *